United States Patent Office 3,446,710
Patented May 27, 1969

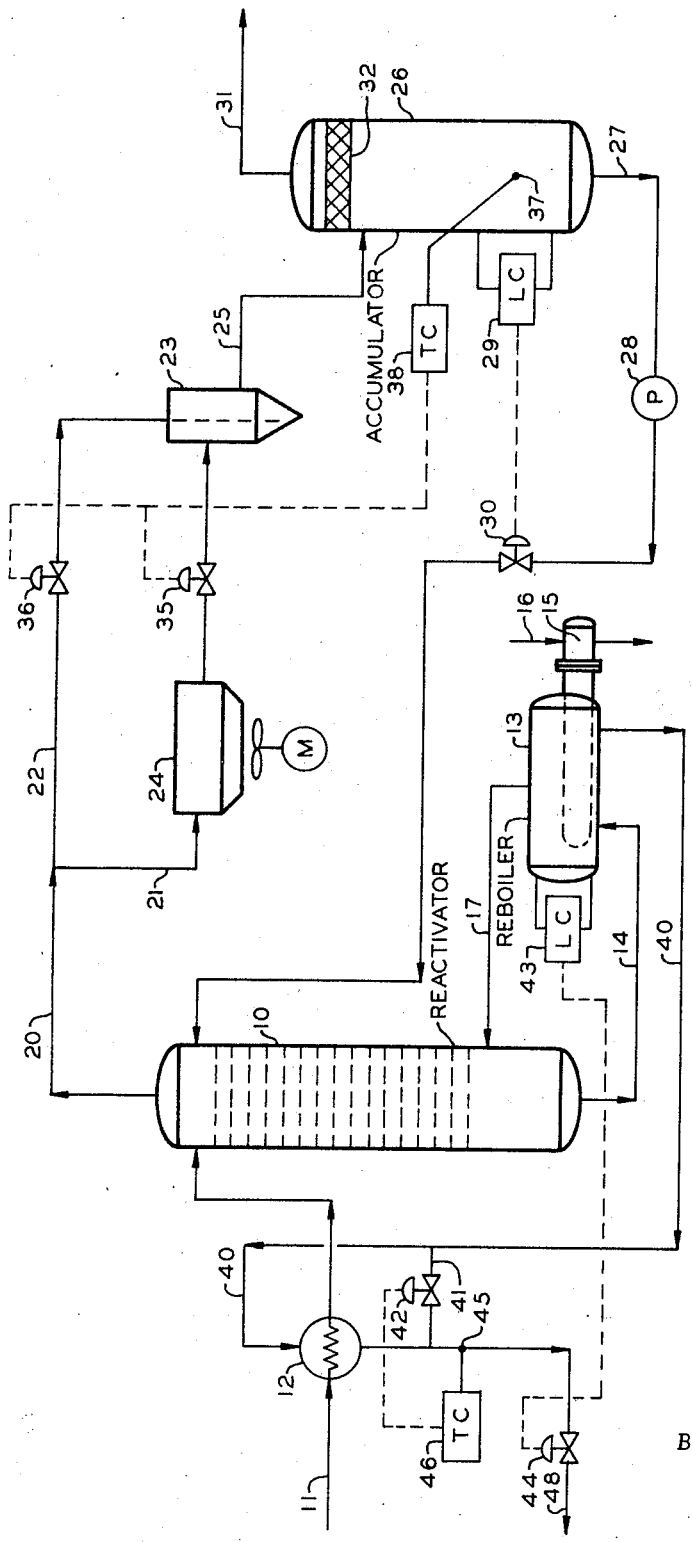

3,446,710
DISTILLATION SYSTEM WITH TEMPERATURE CONTROL OF REFLUX LIQUID
Frank M. Sissons, Jr., Old Ocean, Tex., and Gordon D. Goering, Aguirre, Puerto Rico, assignors to Phillips Petroleum Company, a corporation of Delaware
Filed Jan. 31, 1968, Ser. No. 701,914
Int. Cl. B01d *3/42, 3/14*
U.S. Cl. 202—160                                    4 Claims

ABSTRACT OF THE DISCLOSURE

A fluid separation system, such as a vapor-liquid contacting column employed to strip gases from a liquid stream, is controlled to maintain desired operating temperatures. The relative flows of overhead vapor through and around a condenser are regulated in response to a measured temperature of the reflux liquid. Liquid from the bottom of the column is passed in heat exchange relationship with the feed to the column.

---

This invention relates to the control of temperatures in fluid separation systems.

It is common practice in the petroleum and chemical industries to remove acidic gases from fluid streams by the use of basic treating agents such as caustic solutions and various amines. After contact with the fluid stream to be treated, the spent treating agent is reactivated by removing acidic gases. This can be accomplished by the use of a vapor-liquid contacting column. The impure treating agent is normally introduced near the top of the column to permit acidic gases to be flashed overhead. The overhead vapors from the column are partially condensed to provide liquid to reflux the column. The purified treating agent is removed as a kettle product stream from the column.

In systems of this type it is desirable to operate the column at a relatively low pressure in order to facilitate the flashing of acidic gases. Because of the fact that the entire overhead condensate is returned to the column as reflux, it is quite important to control the temperature of this stream. This is accomplished in accordance with the present invention. A portion of the overhead vapor is directed through a condenser and the remainder bypasses the condenser. The relative flows of the two streams are controlled in response to a measurement of temperature of reflux liquid so as to maintain the temperature of the reflux liquid constant at a predetermined value. This temperature control is advantageously accomplished by manipulating in opposite directions, valves disposed in the two flow conduits. Additional temperature control is provided in accordance with this invention by heat exchanging the feed with a portion of the kettle product in response to a temperature measurement.

Accordingly, it is an object of this invention to provide an improved temperature control system for use in fluid separation systems.

Another object is to provide a novel method of controlling the regeneration of treating materials.

Other objects, advantages and features of the invention should become apparent from the following detailed description, taken in conjunction with the accompanying drawing which is a schematic representation of a separation system having the control elements of this invention incorporated therein.

Referring now to the drawing in detail, there is shown a vapor-liquid contacting column 10 which is employed to remove acidic gases from a treating material. For example, this treating material can be a monoethanolamine solution which has been used to remove acidic gases from a hydrocarbon stream. Such a material is introduced into the upper region of reactivator column 10 through a conduit 11 which extends through a heat exchanger 12. Heat is supplied to column 10 by means of an external reboiler 13. A portion of the kettle product removed from column 10 is introduced into reboiler 13 by means of a conduit 14 and is returned to column 10 through a conduit 17. The reboiler is provided with a heater 15 through which steam or other heating material is passed by means of a conduit 16.

Overhead vapors are removed from the top of column 10 through a conduit 20 which communicates with branched conduits 21 and 22, the latter rejoining at a mixing chamber 23. Conduit 21 has a condenser 24 therein. A conduit 25 extends from mixing chamber 23 to an accumulator 26. The downstream end of conduit 22 preferably extends into mixing chamber 23 to a region beneath the surface of liquid therein such that vapors passed through conduit 22 are sparged into the condensate produced by condenser 24. A conduit 27, which has a pump 28 therein, extends from accumulator 26 to the upper region of column 10 to return liquid to the column as reflux. The rate of flow of this reflux is regulated by a liquid level controller 29 on accumulator 26 which adjusts a valve 30 in conduit 27. Gases are removed from the top of accumulator 26 through a conduit 31. The accumulator can be provided with a de-mister 32 in the top thereof.

An important feature of this invention resides in the control of the temperature of the liquid reflux returned to column 10. This is accomplished by means of valves 35 and 36 which are positioned in respective conduits 21 and 22. A temperature sensing element 37 is positioned within accumulator 26 to provide a signal representative of the temperature of the liquid in the accumulator. Element 37 is connected to a temperature controller 38 which provides an output signal that is representative of the measured temperature. This output signal is employed to control the operation of valves 35 and 36. The two valves act in opposite directions in response to change in output signal from controller 38. If the measured temperature of liquid in accumulator 26 should tend to increase, for example, valves 35 and 36 are manipulated to lower the temperature of the fluid mixture supplied to the accumulator. This is accomplished by opening valve 35 and closing valve 36 to increase the amount of fluid directed through condenser 24. Conversely, a decrease in temperature in accumulator 26 results in the opening of valve 36 and the closing of valve 35. If desired, element 37 can be positioned within reflux conduit 27.

In order to provide additional temperature control, a portion of the kettle product from column 10 is passed in heat exchange relationship with the feed to the column. This kettle product is removed from reboiler 13 through a conduit 40 which communicates with heat exchanger 12. A bypass conduit 41, having a valve 42 therein, is connected in parallel with heat exchanger 12 to control the amount of kettle product which is passed in heat exchange relationship with the feed. The total flow through conduit 40 is regulated by a liquid level controller 43 on reboiler 13 which adjusts a valve 44 in conduit 40. A temperature sensing element 45 is connected to conduit 40 downstream from conduit 41. The signal from element 45 is applied to a temperature controller 46 to adjust valve 42 to maintain a constant temperature at element 45. This serves to control the temperature of the incoming feed to provide a more stable operation within column 10.

In one specific example of the operation of the control features of this invention, reactivator column 10 is employed to purify a monoethanolamine solution which has been employed to scrub hydrogen sulfide from a hydrocarbon stream containing primarily ethane and propane. Column 10 is operated at a pressure of about 10 p.s.i.g., a top temperature of about 225° F., and a bottom temperature of about 240° F. Accumulator 26 is operated at a pressure of about 6 p.s.i.g. and a temperature of about 130° F. Typical flows through the system are as follows:

| Component | Conduit (pounds/hour) | | | | |
|---|---|---|---|---|---|
| | 11 | 40 | 20 | 27 | 31 |
| Monoethanolamine | 8,190 | 8,190 | Trace | Trace | |
| Water | 37,310 | 37,230 | 3,440 | 3,360 | 80 |
| Hydrogen sulfide | 1,140 | | 1,140 | Trace | 1,140 |
| Carbon dioxide | 173 | | 173 | Trace | 173 |

Controller 38 divides the flow of overhead gas from column 10 between conduits 21 and 22 so as to maintain the temperature in the accumulator at about 130° F. This control based on temperature is quite important in order to permit column 10 to be operated at low pressures.

While this invention has been described in conjunction with presently preferred embodiments, it obviously is not limited thereto.

What is claimed is:

1. In a fluid separation system which includes a distillation column having an inlet to receive a fluid mixture to be separated, a first outlet at the top of said column to permit withdrawal of an overhead stream, and a second outlet in the bottom of said column to permit withdrawal of a kettle stream; means connected to said column to supply heat to fluid in said column; a condenser; an accumulator; first conduit means, including said condenser, connected between said first outlet and said accumulator; and second conduit means connected between said accumulator and the upper region of said column to pass liquid from said accumulator to said column as reflux; a control system comprising a mixing vessel in said first conduit means between said condenser and said accumulator, third conduit means having one end connected to the inlet of said condenser and having the second end extending into said mixing vessel to a region near the bottom thereof to direct vapor passed through said third conduit means directly into liquid contained within said vessel, temperature sensing means positioned to measure the temperature of the reflux liquid, and means responsive to said temperature sensing means to control the relative flows of fluids through said first and third conduit means so as to maintain said reflux liquid at a predetermined temperature.

2. The control system of claim 1 wherein said temperature sensing means is positioned to measure the temperature of liquid in said accumulator.

3. In a fluid separation system which includes a distillation column having an inlet to receive a fluid mixture to be separated, a first outlet at the top of said column to permit withdrawal of an overhead stream, and a second outlet in the bottom of said column to permit withdrawal of a kettle stream; means connected to said column to supply heat to fluid in said column; a condenser; an accumulator; first conduit means, including said condenser, connected between said first outlet and said accumulator; and second conduit means connected between said accumulator and the upper region of said column to pass liquid from said accumulator to said column as reflux; a control system comprising a mixing vessel in said first conduit means between said condenser and said accumulator, third conduit means having one end connected to the inlet of said condenser and having the second end extending into said mixing vessel to a region near the bottom thereof to direct vapor passed through said third conduit means directly into liquid contained within said vessel, a first valve in said first conduit means, a second valve in said third conduit means, temperature sensing means positioned to measure the temperature of the reflux liquid, means responsive to said temperature sensing means to move said first valve toward an open position and to move said second valve toward a closed position when the sensed temperature tends to increase and to move said first valve toward a closed position and to move said second valve toward an open position when the sensed temperature tends to decrease, a heat exchanger, fourth conduit means communicating with said heat exchanger and the inlet of said column to pass a fluid mixture to be separated through said heat exchanger into said column; fifth conduit means, including said heat exchanger, connected to said second outlet to pass a liquid stream from said column through said heat exchanger in indirect heat exchange relationship with the feed to said column, sixth conduit means connected between said fifth conduit means upstream and downstream of said heat exchanger, second temperature sensing means positioned to measure the temperature of fluid in said fifth conduit means downstream of said heat exchanger and downstream of said sixth conduit means, and means responsive to said second temperature sensing means to control the flow of fluid through said sixth conduit means.

4. In a fluid separation system which includes a distillation column having an inlet to receive a fluid mixture to be separated, a first outlet at the top of said column to permit withdrawal of the overhead stream, and a second outlet in the bottom of said column to permit withdrawal of a kettle stream; means connected to said column to supply heat to fluid in said column; a condenser; an accumulator; first conduit means, including said condenser, connected between said first outlet and said accumulator; and second conduit means connected between said accumulator and the upper region of said column to pass liquid from said accumulator to said column as reflux; a control system comprising a heat exchanger, third conduit means communicating with said heat exchanger and the inlet of said column to pass a fluid mixture to be separated through said heat exchanger into said column; fourth conduit means, including said heat exchanger, connected to said second outlet to pass a liquid stream from said column through said heat exchanger in indirect heat exchange relationship with the feed to said column; fifth conduit means connected between said fourth conduit means upstream and downstream of said heat exchanger; temperature sensing means positioned to measure the temperature of fluid in said fourth conduit means downstream of said heat exchanger and downstream of said fifth conduit means; and means responsive to said temperature sensing means to control the flow of fluid through said fifth conduit means.

References Cited

UNITED STATES PATENTS

| 2,711,992 | 6/1955 | Kerner | 203—2 |
| 2,868,701 | 1/1959 | Berger | 196—132 |
| 3,039,941 | 6/1962 | Sweeney et al. | 203—2 |
| 3,049,886 | 8/1962 | Cabbage | 62—21 |
| 3,151,044 | 9/1964 | Oglesby | 203—2 |
| 3,249,519 | 5/1966 | Cabbage et al. | 203—2 |
| 3,296,121 | 1/1967 | Potts | 196—132 |
| 3,359,185 | 12/1967 | Matta | 203—2 |

WILBUR L. BASCOMB, JR., *Primary Examiner.*

U.S. Cl. X.R.

202—206, 177, 181, 162; 203—1, 2, 23; 260—583